Oct. 4, 1955     O. H. SCHMITT ET AL     2,719,366
BOMB SIMULATOR
Filed Oct. 12, 1944
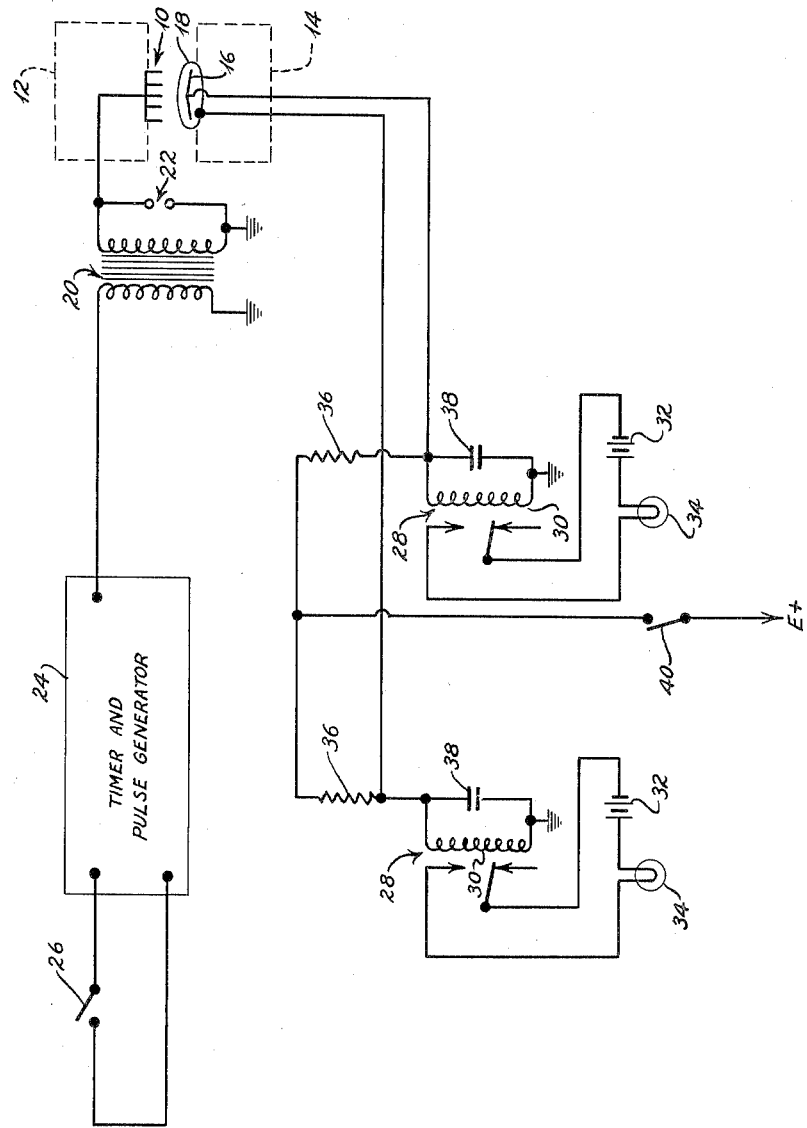
INVENTORS
Otto H. Schmitt and
BY George S. Dzwans
ATTORNEYS

United States Patent Office 2,719,366
Patented Oct. 4, 1955

2,719,366

BOMB SIMULATOR

Otto H. Schmitt, Port Washington, N. Y., and George S. Dzwons, Tulsa, Okla., assignors to the United States of America as represented by the Secretary of the Navy Application October 12, 1944, Serial No. 558,408

2 Claims. (Cl. 35—25)

This invention relates to devices for simulating bombs and adapted for use in training systems of the type in which a target and an attacking craft are reproduced in model form.

In training devices of the type herein contemplated, a scale-model target is provided and a scale-model attacking craft, as for example an aircraft, is arranged under the control of an operator trainee to maneuver in relation to the target model. In such training systems, it is desirable to reproduce the conditions of an actual attack and to provide means for simulating the dropping of bombs or other missiles by the attacking craft. A corollary requirement is the provision of means for indicating the results of the simulated bombing.

There is provided, therefore, in accordance with the present invention a system by means of which an actual bombing attack may be simulated. In this system, bombs are simulated by high-tension sparks which are arranged, under the proper conditions, to jump from an array of points on the attacking craft model to a target on the target model.

The array of points, referred to above, is mounted on the model of the attacking craft in such manner that the points move in a plane parallel to the plane in which the target model is situated as the model of the attacking craft maneuvers under the control of the operator. The configuration of points forming the array may be arranged to simulate any desired number and pattern of bombs. The target, mounted on the target model, comprises one or more effectively grounded conductors reproducing to scale the vulnerable areas of the target.

Means are provided, under the control of the operator, momentarily to raise the points of the bomb array to a high potential in respect to ground. If the operator chooses to excite the bomb array at a moment when the attacking-craft model and target model are in juxtaposition, a spark will jump from it to the target on the target model. Suitable devices are provided to detect the passage of sparks from the array to the target, thereby to indicate the results of the simulated bombing.

One system in accordance with the invention is shown schematically in the accompanying drawing. In this system, a bomb array 10 comprising, for example, five points spaced along a straight line, is mounted on the attacking-craft model indicated schematically at 12. A target, mounted on the target model indicated schematically at 14 in respect to which the attacking-craft model may be moved, comprises two conducting wires 16 and 18. Of the target wires, wire 16 conveniently represents to scale the vulnerable area of the target while wire 18 represents the area surrounding the target in which a near hit might be scored. Wire 18 is so mounted that its separation from the plane of motion of the bomb array is slightly greater than that of wire 16 from the same plane. Thus, if the bomb array is energized when any of the points thereof are in juxtaposition with the vulnerable parts of the target, sparks, taking the shortest possible path, will jump to wire 16 in preference to wire 18.

Bomb array 10 is momentarily raised to a high potential in respect to ground at the will of the operator through the use of a spark coil 20 and a suitable control device, the terminals of the secondary winding of the spark coil being connected respectively to the bomb array and to ground. Thus, whenever a pulse is sent through the primary winding of the spark coil, the bomb array is momentarily raised to a high potential. This potential causes a spark to leap to the effectively grounded target wires if the model bearing the bomb array is in juxtaposition with the target model. A spark gap 22 is connected across the secondary winding of the spark coil and allows the charge on the bomb array to discharge if the condition of juxtaposition is not realized at the moment the bomb array is excited, the separation of the spark gap being slightly greater than the greatest separation between the target wires and the plane of the bomb array.

Since all available bombs may be dropped simultaneously during an attack or in salvos of submultiples of the total number carried, the nature of the control device mentioned above depends to a large degree upon the type of bombing to be simulated. Accordingly, there is shown in block form a timer and pulse generator unit 24, the output of which is applied to the primary winding of the spark coil. The operation of this time device is shown as controlled by means of a key 26, it being understood that independent adjustments (not shown) may be provided to alter both the number of pulses applied to the spark coil in response to the closing of key 26 and the time separation between these pulses. The control device may be of any well-known type comprising, for example, either resistance-capacitance timing circuits or motor-driven cams and switches arranged to control the discharge of capacitors through the primary winding of the spark coil.

Indicating devices are associated with each of target wires 16 and 18 and are arranged to control lamps indicating hits or near hits whenever sparks from the bomb array reach the appropriate target wire. These indicating devices in each case include relays 28, the coils 30 of which are connected between the respective target wires and ground. Relays 28 control circuits including batteries 32 and indicator lamps 34. Each of relay coils 30 is connected through a resistor 36 to a source of positive potential indicated at E+, from which a constant current flows through the relay coils to ground. The magnitude of this current is adjusted to such a value that it is insufficient to pull the relays in but is sufficient to hold the relays in once they have been actuated. Integrating capacitors 38 are connected across relay coils 30, as shown. The integrated current pulse resulting from the passage of a spark between the bomb array and a target wire is sufficient to cause the relay associated with the target wire to which the spark jumps to pull in, closing the circuit to the associated indicating lamp. The system is reset for use by momentarily interrupting the holding current flowing from E+ to the relay coils by means of normally closed switch 40.

What is claimed is:

1. In a training system for bombing runs using a target model and an attacking aircraft model maneuverable by the trainee in a plane parallel to the plane of movement of the target model, electric discharge means on said aircraft model for simulating released bombs at points of discharge on said aircraft, said discharge means including a timer and pulse generator for timing and distributing the discharge pulses to said points of discharge successively or in salvos to simulate any desired number and pattern of bombs, means for operating said discharge means under control of said trainee, conductor means on said target model representing vulnerable portions thereof for receiving the electric discharges from said discharge means when the points of discharge are in juxtaposition with said conductor means, said conductor means including a first conductor for receiving a discharge representing a direct hit on the corresponding vulnerable portion, a second conductor covering an additional area surrounding said first conductor for receiving a discharge representing a near miss, and a separate indicating circuit provided with an indicator for each of said conductors to indicate the corresponding hit or miss.

2. The combination defined in claim 1 wherein each of said indicating circuits consists of a relay connected to the corresponding conductor; an electrical current indicator, a source of current and a switch in a series circuit; said switch being operated by said relay in response to reception of a discharge by the corresponding conductor.

References Cited in the file of this patent

UNITED STATES PATENTS

| | | |
|---|---|---|
| Re. 12,916 | Fiske | Feb. 9, 1909 |
| 833,207 | Frank | Oct. 16, 1906 |
| 1,381,158 | Barry | June 14, 1921 |
| 1,747,664 | Droitcour | Feb. 18, 1930 |
| 1,803,064 | Karnes et al. | Apr. 28, 1931 |
| 1,807,615 | Behr | June 2, 1931 |
| 2,077,383 | Foisy | Apr. 20, 1937 |
| 2,093,427 | Eckstein | Sept. 2, 1937 |
| 2,287,429 | Hooker et al. | June 23, 1942 |
| 2,345,744 | Glenny | Apr. 4, 1944 |

OTHER REFERENCES

Chicago Apparatus Co. Catalog, copyright 1931, page 162.